United States Patent [19]

Saegusa et al.

[11] Patent Number: 4,958,005
[45] Date of Patent: Sep. 18, 1990

[54] FLUORINE-CONTAINING COMPOSITIONS AND PROCESS FOR PREPARING THE SAME FROM CYCLIC IMINOETHERS

[75] Inventors: Takeo Saegusa; Masatoshi Miyamoto, both of Kyoto; Yoshiyuki Sano, Shiga, all of Japan

[73] Assignee: Daikin Industries, Ltd., Osaka, Japan

[21] Appl. No.: 246,748

[22] Filed: Sep. 20, 1988

[30] Foreign Application Priority Data

May 7, 1986 [JP] Japan .................. 61-105721

[51] Int. Cl.$^5$ .................................. C08G 73/00
[52] U.S. Cl. .................................. 528/408; 528/401; 528/403; 525/410; 564/153; 564/159; 564/215; 564/224; 548/239; 544/88
[58] Field of Search ............... 528/408; 564/153, 159, 564/215, 224; 548/239; 544/88

[56] References Cited

U.S. PATENT DOCUMENTS

| | | | |
|---|---|---|---|
| 3,458,456 | 7/1969 | Levy et al. | 528/408 |
| 3,483,141 | 12/1969 | Litt et al. | 528/402 |
| 3,575,890 | 4/1971 | Litt et al. | 528/402 |
| 3,640,909 | 2/1972 | Jones et al. | 528/226 |
| 4,011,376 | 3/1977 | Tomalia et al. | 528/392 |
| 4,365,056 | 12/1982 | Sunder-Plassmann | 528/403 |

FOREIGN PATENT DOCUMENTS 1215930 5/1966 Fed. Rep. of Germany .
2453774 5/1975 Fed. Rep. of Germany .

OTHER PUBLICATIONS

European Patent Office Search Report, EPO Application 87106505.8.

*Primary Examiner*—John Kight, III
*Assistant Examiner*—Frederick Krass

*Attorney, Agent, or Firm*—Birch, Stewart, Kolasch & Birch

[57] ABSTRACT

A fluorine-containing composition represented by formula (I)

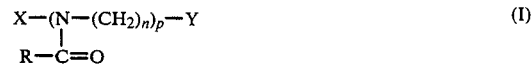

wherein X represents a group containing a polyfluoroaliphatic group having from 3 to 26 carbon atoms; R represents a hydrogen atom or an aliphatic group having from 1 to 3 carbon atoms; n represents an integer of from 2 to 3; p represents an integer of from 1 to 100; and Y represents a group represented by formula (II) or formula (III)

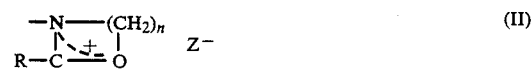

wherein R represents a hydrogen atom or an aliphatic group having from 1 to 3 carbon atoms; n represents an integer of from 2 to 3; and Z represents an iodine atom, a sulfonate group, or a sulfate group,

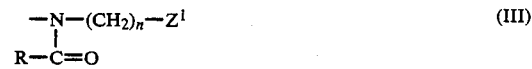

wherein R represents a hydrogen atom or an aliphatic group having from 1 to 3 carbon atoms; n represents an integer of from 2 to 3; and $Z^1$ represents an iodine atom, a bromine atom, a chlorine atom, or a hydroxyl group; and a process for preparing the same.

11 Claims, No Drawings

FLUORINE-CONTAINING COMPOSITIONS AND PROCESS FOR PREPARING THE SAME FROM CYCLIC IMINOETHERS

FIELD OF THE INVENTION

The present invention relates to a fluorine-containing composition and a process for preparing the same. Particularly, the fluorine-containing composition comprises a fluorine-containing compound or polymer.

BACKGROUND OF THE INVENTION

Hitherto, compositions containing fluorine have been used as a releasing agent, an additive for a foam fire extinguisher, a foam stabilizer for expanded materials, a mixing assistant for resins, an antistatic agent, etc., as described, e.g., in Japanese Patent Publication No. 11325/82. However, the performance thereof is not fully satisfactory for practical use. Furthermore, such conventional fluorine-containing compositions are water-insoluble, and thus they cannot be used for the purpose of reducing the surface tension of water.

SUMMARY OF THE INVENTION

Therefore, an object of the present invention is to provide a fluorine-containing composition which is advantageously used as a surface active agent, etc.

Another object of the present invention is to provide a process for preparing a fluorine-containing composition which is advantageously used as a surface active agent, etc.

As a result of various investigations conducted by the present inventors, it is found that the above and the other objects of the present invention are achieved by a fluorine-containing composition having a specific repeating unit, and process for preparing the same. In particular, the present invention relates to a fluorine-containing composition represented by formula (I)

(I)

wherein X represents a group containing a polyfluoroaliphatic group having from 3 to 26 carbon atoms; R represents a hydrogen atom or an aliphatic group having from 1 to 3 carbon atoms; n represents an integer of from 2 to 3; p represents an integer of from 1 to 100; and Y represents a group represented by formula (II) or formula (III)

(II)

wherein R represents a hydrogen atom or an aliphatic group having from 1 to 3 carbon atoms; n represents an integer of from 2 to 3; and Z represents an iodine atom, a sulfonate group, or a sulfate group,

(III)

wherein R represents a hydrogen atom or an aliphatic group having from 1 to 3 carbon atoms; n represents an integer of from 2 to 3; and $Z^1$ represents an iodine atom, a bromine atom, a chlorine atom, or a hydroxyl group, and a process for preparing the same.

DETAILED DESCRIPTION OF THE INVENTION

The present invention provides a process for preparing a fluorine-containing composition represented by formula (IV)

(IV)

wherein X represents a group containing a polyfluoroaliphatic group having from 3 to 26 carbon atoms; R represents a hydrogen atom or an aliphatic group having from 1 to 3 carbon atoms; n represents an integer of from 2 to 3; p represents an integer of from 1 to 100; and $Y^1$ represents a group represented by formula (II) or formula (V)

(II)

wherein R represents a hydrogen atom or an aliphatic group having from 1 to 3 carbon atoms; n represents an integer of from 2 to 3; and Z represents an iodine atom, a sulfonate group, or a sulfate group,

(V)

wherein R represents a hydrogen atom or an aliphatic group having from 1 to 3 carbon atoms; n represents an integer of from 2 to 3; and $Z^3$ represents an iodine atom, a bromine atom, or a chlorine atom, the process comprising a step of ring opening a cyclic iminoether represented by formula (VI)

(VI)

wherein R represents a hydrogen atom or an aliphatic group having from 1 to 3 carbon atoms, by the use of a polymerization initiator represented by formula (VII)

$$X-Z^2 \quad (VII)$$

wherein X represents a group containing a polyfluoroaliphatic group having from 3 to 26 carbon atoms; and $Z^2$ represents a sulfonate group, a sulfate group, an iodine atom, a bromine atom, or a chlorine atom; and a process for preparing a fluorine-containing composition represented by formula (VIII)

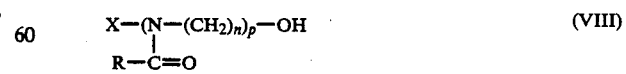
(VIII)

wherein X represents a group containing a polyfluoroaliphatic group having from 3 to 26 carbon atoms; R represents a hydrogen atom or an aliphatic group having from 1 to 3 carbon atoms; n represents an integer of from 2 to 3; and p represents an integer of from 1 to 100, the process comprising steps of (1) ring opening a cyclic iminoether represented by formula (VI)

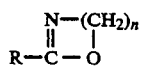 (VI)

wherein R represents a hydrogen atom or an aliphatic group having from 1 to 3 carbon atoms, by the use of a polymerization initiator represented by formula (IX)

$$X-Z^4 \quad (IX)$$

wherein X represents a group containing a polyfluoroaliphatic group having from 3 to 26 carbon atoms; and $Z^4$ represents an iodine atom, a sulfonate group, or a sulfate group; and (2) reacting the thus obtained composition with an aqueous alkaline solution In the above-described processes, ring opening polymerizing occurs when p of formulae (IV) and (VIII), which represent the fluorine-containing compositions obtained by the respective processes, is at least 2.

The fluorine-containing composition according to the present invention, in which Y in formula (I) represents a group represented by formula (II) or formula (III) while $Z^1$ in formula (III) represents an iodine atom, a bromine atom, a chlorine atom, can be obtained by step (1) only.

In step (2), when the composition obtained in step (1) has the propagating end group represented by formula (II), such composition can be converted into the fluorine-containing composition of the present invention in which Y in formula (I) is represented by formula (III) wherein $Z^1$ is a hydroxyl group by reacting with an aqueous alkaline solution.

The number of the carbon atoms contained in the group represented by X is preferably from 5 to 15 in view of the performance as surface active agent of the composition obtained. In the group represented by X, the number of the fluorine atoms is preferably the same number as the carbon atoms contained therein or more, and more preferably 1.5 times the number of the carbon atoms contained therein or more.

The number of n is not limited, but if n is from 2 to 3, the raw material can be obtained easily.

The unit or number of the repeating units p can be controlled by adjusting the ratio of the polymerization initiator to the cyclic iminoether upon reaction, or wherein p is at least 2, upon polymerization reaction.

The fluorine-containing composition is a fluorine-containing polymer when p is at least 2, and when p is 2 or 3, the fluorine-containing polymer is an oligomer. The fluorine-containing composition includes fluorine-containing polymers in which p is an average number of repeating units of 2 to about 13. The fluorine-containing composition is a fluorine-containing compound when p is 1.

The fluorine-containing composition of the present invention preferably has a number of the repeating units p of 50 or less.

As the polymerization initiator represented by formula (VII), any compound having an ionic property, e.g., represented by $(X)^+\cdot(Z^2)^-$, and having no adverse effect on the ring opening of the present invention can be used. Upon ring opening, $X^+$ attacks the nitrogen atom of the cyclic iminoether. Then, if $Z^2$ is an iodine atom, a sulfonate group, or a sulfate group, the corresponding onium salt is formed, and $(Z^2)^-$ becomes the counter ion of the propagating end group (formula (II)).

Examples of the group represented by X include groups represented by formulae (X-1), (X-2), (X-3), (X-4), or (X-5)

 (X-1)

 (X-2)

 (X-3)

 (X-4)

 (X-5)

wherein i represents an integer of from 4 to 22, j represents an integer of from 1 to 4, k represents 1 or 2, and $R^2$ and $R^3$, which may be the same or different, each represents a hydrogen atom or a methyl group. Preferably, X represents a group represented by formula (X-1) above wherein j represents 2.

Examples of the sulfonate group represented by Z include a trifluoromethane sulfonate group, a benzene sulfonate group, a p-toluene sulfonate group (tosyl group), etc. Examples of the sulfate group represented by Z include an alkyl sulfonate group such as a methyl sulfonate group, an ethyl sulfonate group, etc. Preferably, Z represents a p-toluene sulfonate group (tosyl group).

In the ring opening of step (1), the molar ratio of the cyclic iminoether to the polymerization initiator (iminoether/initiator) can be freely varied, but preferably is from 0.1/1 to 500/1, and more preferably from 0.5/1 to 50/1. The polymerization temperature is preferably from 0 to 200° C., and more preferably from 60° to 120° C. As the solvents used in the polymerization, an aprotic solvent such as dimethyl formamide, acetonitrile, etc., is preferably used.

In step (2), the aqueous alkaline solution preferably has a concentration of from 1 to 20 wt %, and preferably used in large excess based on the amount of the polymer obtained in step (1). The reaction temperature in step (2) is preferably from 10° to 50° C.

The present invention will be described specifically in examples hereinafter, but the invention is not construed as being limited to the examples.

EXAMPLE 1

A fluorine-containing polymer of the present invention is produced by steps (1) and (2).

Step (1)

A mixture of 1.00 g (1.62 mmol) of a polymerization initiator represented by n-$C_8F_{17}CH_2CH_2OTs$ (Ts represents a tosyl group), 1.60 g (16.2 mmol) of a cyclic iminoether represented by formula (A), and 5 ml of dimethylformamide is placed in a test tube provided with a magnetic stirrer and a three-way cock. Then the test tube is sealed and heated to 100° C. for 100 hours while stirring.

 (A)

Thereafter, the reaction mixture is poured into a mixed solvent of diethyl ether and chloroform (1/1 by volume) to precipitate the thus formed polymer. The polymer is collected by decantation, dissolved in chloroform, and reprecipitated from the above mixed solvent, followed by drying under reduced pressure to obtain 1.66 g of yellow waxy polymer (yield: 64%).

The results of a nuclear magnetic resonance (NMR) analysis of the onium salt at the propagating end of the polymer are indicated below.

δ(ppm)=2.20(b), 2.29(e), 2.40(d), 3.60(a), 4.53(c)

(a) to (e) correspond to the hydrogen atoms in the following formula. (Ph represents a phenylene group.)

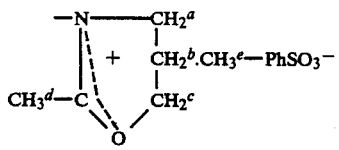

Step (2)

The waxy polymer obtained in the step (1) is added to 20 ml of a sodium hydroxide aqueous solution (5 wt %), and stirred for 30 minutes at 20° C. Then, the components other than the desired polymer are extracted by dichloromethane, and the polymer is dried under reduced pressure to obtain 1.50 g of polymer A' represented by formula (A') (yield: 64%).

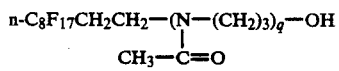

The results of the analysis of polymer A' are indicated below.

Average molecular weight: 1,600
Average number of repeating units (q): 11.5
NMR analysis: δ(ppm)=1.4–2.3 (C—CH$_2$—C and C(O)—CH$_3$) 2.6–4.0 (—CH$_2$-CF$_2$— and N—CH$_2$)
Infrared absorption spectrum (IR) analysis (cm$^{-1}$): 3,400 ($^V$OH), 2,940, 1,620 ($^V$C=O), 1,484, 1,422, 1,380 ($^V$CF), 1,243, 1,205, 1,143

The molecular weight analysis is carried out by using an osmometer (Hitachi, Ltd., Model 117, solvent: chloroform, at 40° C.). The average number of the repeating units is calculated from the molecular weight. The NMR analysis is carried out by using an NMR spectrometer (Hitachi, Ltd., Model R-200). The IR analysis is carried out by using an infrared absorption spectrometer (Hitachi, Ltd., Model 260-20).

EXAMPLES 2 TO 4

The same procedures as in Example 1 including steps (1) and (2) are repeated except that:

4.86 mmol of a cyclic iminoether represented by formula (B) is used instead of the cyclic iminoether of Example 1 (Example 2);

9.23 mmol of a cyclic iminoether represented by formula (C) is used instead of the cyclic iminoether of Example 1 (Example 3); and 3.24 mmol of a cyclic iminoether represented by formula (D) is used instead of the cyclic iminoether of Example 1 (Example 4).

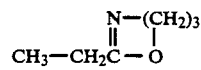

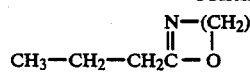

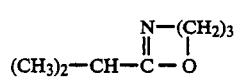

The thus obtained polymers in Examples 2, 3, and 4 are designated polymers B', C', and D', respectively.

Polymers B' to D' are analyzed in the same manner as in Example 1, and the results obtained are indicated below.

Polymer B'

Average molecular weight: 830
Average number of repeating units (q): 3.2
NMR analysis: δ(ppm)=0.9–1.4 (C(O)—C—CH$_3$), 1.4–2.1 (C—CH$_2$—C), 2.1–2.6 (C(O)—CH$_2$), 2.7–4.1 (—CH$_2$—CF$_2$— and N—CH$_2$)
IR analysis (cm$^{-1}$): 3,420 ($^V$OH), 1,620 ($^V$C=O), 1,483, 1,432, 1,380 ($^V$CF), 1,240, 1,146, 1,065

Polymer C'

Average molecular weight: 770
Average number of repeating units (q): 2.5
NMR analysis: δ(ppm)=0.8–1.2 (CH$_3$), 1.3–2.1 (C—CH$_2$—C), 2.2–2.8 (C(O)—CH and —CH$_2$—CF$_2$), 3.0–4.1 (N—CH$_2$)
IR analysis (cm$^{-1}$): 3,500 ($^V$OH), 2,960, 2,870, 1,632 ($^V$C=O), 1,467, 1,380 ($^V$CF), 1,220 1,070

Polymer D'

Average molecular weight: 1,730
Average number of repeating units (q): 10.0
NMR analysis: δ(ppm)=0.8–1.3 (CH$_3$), 1.4–2.2 (C—CH$_2$—C), 2.3–2.9 (—CH$_2$-CF$_2$), 2.9–4.2 (N—CH$_2$)
IR analysis (cm$^{-1}$): 3,450 ($^V$OH), 2,980, 2,945, 2,880, 1,630 ($^V$C=O), 1,485, 1,450, 1,384 ($^V$CF), 1,245, 1,085

EXAMPLE 5

A fluorine-containing polymer of the present invention is produced by steps (1) and (2).

Step (1)

A mixture of 1.00 g (1.62 mmol) of a polymerization initiator represented by n-C$_8$F$_{17}$CH$_2$CH$_2$OTs, 0.14 g (1.64 mmol) of a cyclic iminoether represented by formula (E), and 10 ml of dimethylformamide is placed in a test tube provided with a magnetic stirrer and a three-way cock. Then the test tube is sealed and heated to 80° C. for 40 hours while stirring.

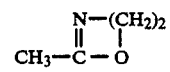

Thereafter, the reaction mixture is poured into a mixed solvent of diethyl ether and hexane (1/1 by volume) to precipitate the thus formed polymer. The polymer is collected by decantation, dissolved in chloroform, and reprecipitated from the above mixed solvent, followed by drying under reduced pressure to obtain 0.26 g of yellow waxy polymer (yield: 23%).

The results of an NMR analysis of the onium salt at the propagating end of the polymer are indicated below.

δ(ppm)=2.31(d), 2.40(c), 2.20(a), 4.90(b) (a) to (d) correspond to the hydrogen atoms in the following formula.

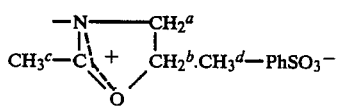

Step (2)

The waxy polymer obtained in step (1) is added to 20 ml of a sodium hydroxide aqueous solution (5 wt %), and stirred for 30 minutes at 20° C. Then, the components other than the desired polymer are extracted by dichloromethane, and the polymer is dried under reduced pressure to obtain 0.22 g of the polymer E' represented by formula (E') (yield: 23%).

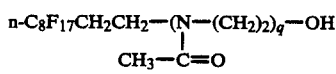

The results of the same analysis as in Example 1 of the polymer E, are indicated below.

Average molecular weight: 1,200
Average number of repeating units (q): 6.2
NMR analysis: δ(ppm)=1.8–2.3 (C(O)—CH$_3$ 2.7–4.1 (—CH$_2$-CF$_2$— and N—CH$_2$)
IR analysis (cm$^{-1}$): 3,400 ($^V$OH), 1,620 ($^V$C=O), 1,484, 1,422, 1,364 ($^V$CF), 1,250, 1,010

EXAMPLE 6

A fluorine-containing polymer of the present invention is produced only by step (1).

A mixture of 1.62 mmol of a polymerization initiator represented by n-C$_8$F$_{17}$CH$_2$CH$_2$I, 32.4 mmol of a cyclic iminoether represented by formula (E), and 10 ml of dimethylformamide is placed in a test tube provided with a magnetic stirrer and a three-way cock. Then the test tube is sealed and heated to 80° C. for 40 hours while stirring.

Thereafter, the reaction mixture is poured into 200 ml of a mixed solvent of diethyl ether and hexane (1/1 by volume) to precipitate the thus formed polymer. The polymer is collected by decantation, dissolved in chloroform, and reprecipitated from the above mixed solvent, followed by drying under reduced pressure to obtain a polymer E" represented by formula (E"). (yield: 88%)

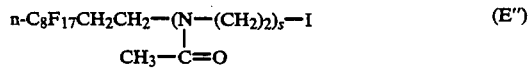

The results of the same analysis as in Example 1 of polymer E" are indicated below.

Average molecular weight: 4,600
Average number of repeating units (s): 48
NMR analysis: δ(ppm)=1.8–2.4 (C(O)—CH$_3$) 2.7–4.1 (—CH$_2$—CF$_2$— and N—CH$_2$)
IR analysis (cm$^{-1}$): 2,920, 1,630 ($^V$C=O), 1,480, 1,415, 360 ($^V$CF), 1,240, 1,010, 740

EXAMPLE 7

The same procedures as in Example 6 including step (1) are repeated except that 1.62 mmol of a cyclic iminoether represented by formula (F) is used instead of the cyclic iminoether of Example 6 to obtain the polymer F, according to the present invention.

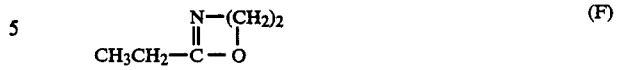

The results of the same analysis as in Example 6 of polymer F' are indicated below.

Average molecular weight: 760
Average number of repeating units (s): 1.9
NMR analysis: δ(ppm)=0.8–1.4 (CH$_3$), 2.0–2.6 (C(O)—CH$_2$), 2.7–3.1 (—CH$_2$—CF$_2$—), 3.2–4.0 (N—CH$_2$)
IR analysis (cm$^{-1}$): 3,410 ($^V$OH), 2,920, 1,640 ($^V$C=O), 1,443, 1,364 ($^V$CF), 1,240, 1,036, 740, 690

EXAMPLE 8

A fluorine-containing polymer of the present invention is produced by steps (1) and (2).

Step (1)

A mixture of 1.00 g (1.62 mmol) of a polymerization initiator represented by n-C$_8$-F$_{17}$CH$_2$CH$_2$OTs, 0.58 g (8.10 mmol) of a cyclic iminoether represented by formula (G), and 5 ml of dimethylformamide was placed in a test tube provided with a magnetic stirrer and a three-way cock. Then the test tube was sealed and heated to 80° C. for 8 hours while stirring.

Thereafter, the reaction mixture is poured into a mixed solvent of diethyl ether and hexane (1/1 by volume) to precipitate thus formed polymer. The polymer is collected by decantation, dissolved in chloroform, and reprecipitated from the above mixed solvent, followed by drying under reduced pressure to obtain a polymer.

Step (2)

The polymer obtained in step (1) is added to 20 ml of a sodium hydroxide aqueous solution (5 wt %), and stirred for 30 minutes at 20° C. Then, the components other than the desired polymer are extracted by dichloromethane, and the polymer is dried under reduced pressure to obtain the polymer G' according to the present invention.

EXAMPLE 9

Polymers A', B', C', D', E', E", F" and G' obtained in Examples 1 to 8, respectively, each are dissolved in water to make 0.1 wt % aqueous solutions, and measured for the surface tension of the aqueous solutions by Wilhelmy method at 20° C., by using Kyowa CBVP Surface Tension Meter A1. The results obtained are mentioned in the following Table 1.

TABLE 1

| Example | Polymer | Surface Tension (dyne/cm) |
|---|---|---|
| 1 | A' | 23.4 |
| 2 | B' | 24.0 |
| 3 | C' | 24.9 |
| 4 | D' | 26.0 |
| 5 | E' | 17.0 |
| 7 | F' | 23.0 |
| 8 | G' | 28.0 |

From the results shown in Table 1 above, the fluorine-containing polymer according to the present invention can greatly reduce the surface tension of water by a small amount. Therefore, the fluorine-containing composition of the present invention is used advantageously as an additive for a foam fire extinguisher, a mixing assistant for resins, an antistatic agent, a foam stabilizer for expanded materials, a releasing agent, an antisticking agent, etc.

Furthermore, by the process according to the present invention, the fluorine-containing composition of the present invention can be prepared easily.

While the invention has been described in detail and with reference to one skilled in the art that various changes and modifications can be made therein without departing from the spirit and scope thereof.

What is claimed is:

1. A fluorine-containing composition represented by formula (I)

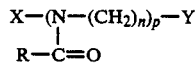   (I)

wherein X represents a group containing a polyfluoroaliphatic group having from 3 to 26 carbon atoms; R represents a hydrogen atom or an aliphatic group having from 1 to 3 carbon atoms; n represents an integer of from 2 to 3; p represents an integer of from 1 to 100; and Y represents a group represented by formula (II) or formula (III)

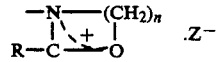   (II)

wherein R represents a hydrogen atom or an aliphatic group having from 1 to 3 carbon atoms; n represents an integer of from 2 to 3; and Z represents an iodine atom, a sulfonate group, or a sulfate group,

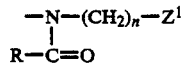   (III)

wherein R represents a hydrogen atom or an aliphatic group having from 1 to 3 carbon atoms; n represents an integer of from 2 to 3; and $Z^1$ represents an iodine atom, a bromine atom, a chlorine atom, or a hydroxyl group.

2. The fluorine-containing composition according to claim 1, wherein X is represented by formula (X-1)

$$C_iF_{2i+1}(CH_2)_j—$$   (X-1)

wherein i represents an integer of from 4 to 22; and j represents 2.

3. The fluorine-containing composition according to claim 1, wherein X represents a group containing a polyfluoroaliphatic group having from 5 to 15 carbon atoms.

4. The fluorine-containing composition according to claim 1, wherein the number of fluorine atoms contained in the group which represents X is at least equal to the number carbon atoms contained in said group.

5. The fluorine-containing composition according to claim 4, wherein the number of fluorine atoms contained in the group which represents X is at least 1.5 times the number of carbon atoms contained in said group.

6. The fluorine-containing composition according to claim 1, wherein Z represents a p-toluene sulfonate group.

7. The fluorine-containing composition according to claim 1, wherein p represents an integer of from 2 to 6.

8. The fluorine-containing composition according to claim 1, wherein said composition is a fluorine-containing polymer in which p of formula (I) is at least 2.

9. The fluorine-containing composition according to claim 1, wherein said composition comprises fluorine-containing polymers in which p of formula (I) is an average number of repeating units of 2 to about 13.

10. The fluorine-containing composition according to claim 17, wherein the fluorine-containing polymer is an oligomer in which p of formula (I) is 2 or 3.

11. The fluorine-containing composition according to claim 1, wherein said composition is a fluorine-containing compound in which p of formula (I) is 1.

* * * * *